Figure 1:
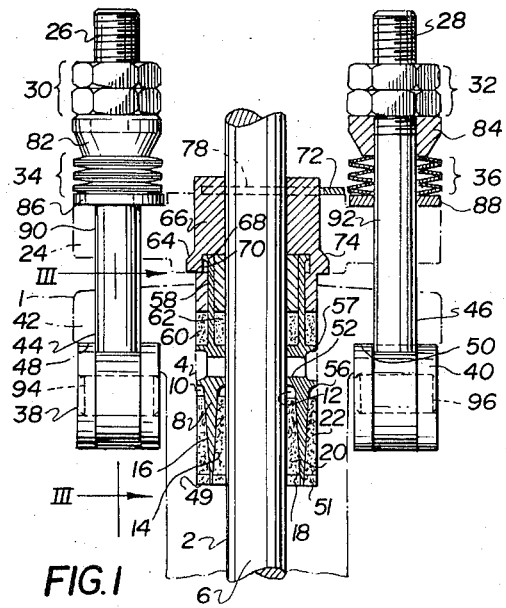

United States Patent [19]

Astill et al.

[11] 3,787,060

[45] Jan. 22, 1974

[54] VALVE STEM PACKING ASSEMBLY

[75] Inventors: Cyril J. Astill, Deep River, Ontario, Canada

[73] Assignee: Canadian Patents and Development Limited, Ottawa, Ontario, Canada

[22] Filed: July 24, 1972

[21] Appl. No.: 274,733

[30] Foreign Application Priority Data
Nov. 12, 1971 Canada............................. 127509

[52] U.S. Cl..................... 277/69, 277/106, 251/214
[51] Int. Cl......................... F16j 15/00, B65d 53/00
[58] Field of Search......... 277/68, 69, 106; 251/214

[56] References Cited
UNITED STATES PATENTS
1,504,901  8/1924  Rogers............................. 277/106
2,200,760  5/1940  White............................... 277/69 X Primary Examiner—Samuel B. Rothberg
Attorney, Agent, or Firm—Francis W. Lemon

[57] ABSTRACT

A valve stem assembly wherein a wedge-shaped sleeve is pushed between packings, sealing a valve stem in a valve housing, by clamping nuts and bolts compressing Belleville washers and cams applying further compression to the Belleville washers. The valve stem is actuated by temporarilly releasing the cams. Preferably outer secondary packing is provided on a cylindrical extension of the wedge-shaped sleeve to trap any fluid which escapes when the cams are temporarilly released.

4 Claims, 3 Drawing Figures

PATENTED JAN 22 1974 3,787,060

VALVE STEM PACKING ASSEMBLY

This invention relates to a valve stem assembly.

In some instances it is necessary to apply relatively high compressive forces to a valve stem packing during normal use to provide a leak-free valve stem assembly. With known types of valve stem assemblies, these high compressive forces are liable to prevent normal operation of the valve stem to actuate the valve.

It is an object of the present invention to provide a valve stem assembly which facilitates operation of the valve stem and yet allows relatively high compressive forces to be applied to the valve stem packing during normal use.

According to the present invention there is provided a valve stem assembly, comprising a valve housing with a valve stem bore, a valve stem extending through the valve stem bore and slidably located therein and through the packing recess, a wedge-shaped sleeve slidably located around the valve stem and dividing a portion of the packing recess into inner and outer annular spaces, the wedge-shaped sleeve having inclined inside and outside surfaces to taper inwardly in thickness towards the inner end of the packing recess, annular packings in the inner and outer annular spaces, a clamping member spaced from the valve housing and connected to the wedge-shaped sleeve for withdrawing the wedge-shaped sleeve from the packing recess, a plurality of threaded clamping bolts and nuts clamping the clamping member to the valve housing, compression springs on the clamping bolts urging the clamping member to push the wedge-shaped sleeve between the packings, thereby compressing the packings radially, and a plurality of cams each rotatably connected to one of the clamping bolts to be rotatably actuated to further compress the compression springs and apply an additional force urging the wedge-shaped sleeve between the packings.

Figure 2:
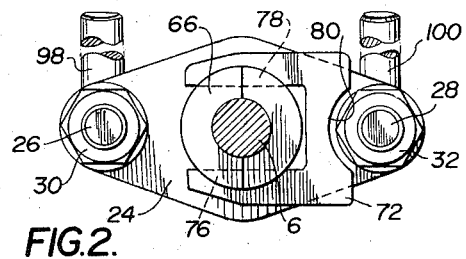
Figure 3:
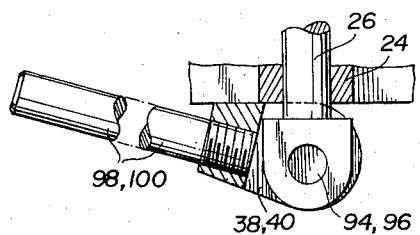

In the accompanying drawings which illustrate by way of example, an embodiment of the invention, FIG. 1 is a part-sectional side view of a valve stem assembly, FIG. 2 is a plan view of FIG. 1, and FIG. 3 is a part sectional end view along III—III, FIG. 1 of a cam rotatably connected to a threaded bolt.

In FIGS. 1 to 3 there is shown a valve stem assembly, comprising a valve housing, a portion of which is shown chain-dotted in FIG. 1 and designated 1, with a valve stem bore, a portion of which is shown chain-dotted and designated 2, and a packing recess 4 (also shown chain-dotted) at the outer end of the valve stem bore 2. A valve stem, a portion of which is shown in FIG. 1 and designated 6, extends and is slidably located therein through the valve stem bore 2 and through the packing recess 4, and a wedge-shaped sleeve 8 is slidably located around the valve stem 6 and divides a portion of the packing recess 4 into inner and outer annular spaces 10 and 12 respectively. The wedge-shaped sleeve 8 having inclined inside and outside surfaces 14 and 16 respectively, to taper inwardly in thickness towards the inner end 18 of the packing recess 4. Annular packings in the form of packing rings 20 and 22, are disposed in the inner and outer annular spaces 10 and 12 respectively. A clamping member 24 is spaced from the valve housing 1 and is connected to the wedge-shaped sleeve 8, as will be described later, for withdrawing the wedge-shaped sleeve 8 from the packing recess 4. A plurality of threaded clamping bolts, in this embodiment two clamping bolts designated 26 and 28 and nuts 30 and 32, clamp the clamping member 24 to the valve housing 1. Compression springs 34 and 36 on the clamping bolts 26 and 28 respectively urge the clamping member 24 to push the wedge-shaped sleeve 8 between the packing rings 20 and 22, thereby compressing them radially, and a plurality of cams, in this embodiment two designated 38 and 40, each are rotatably connected to the clamping bolts 26 and 28 respectively to be rotatably actuated as will be described later to further compress the compression springs 34 and 36, respectively and apply an additional force urging the wedge-shaped sleeve 8 between the packing rings 20 and 22.

The valve housing 1 has a flange portion 42 having clearance holes 44 and 46 for the clamping bolts 26 and 28 respectively and machined surfaces 48 and 50 for the cams 38 and 40 respectively.

Two spacing rings 49 and 51 are located in the packing recess 4 beneath the packing rings 20 and 22 respectively. The wedge-shaped sleeve 8 has a spacing cylinder 52 with four fluid ports 54, and flanged ends 56 and 57 which extend across the packing recess 4. The spacing cylinder 52 is in the packing recess 4 and is integral with, and extends outwardly along the packing recess from, the wedge-shaped sleeve 8. A secondry packing cylinder 58 divides an outer portion of the packing recess 4 radially and is integral with, and extends along the packing recess from, the spacing cylinder 52. Secondary annular packing rings 60 and 62, which are radially split to facilitate assembly, are on each side of the secondary packing cylinder 58, and a sleeve 64 slidable around the valve stem 6 abuts against the secondary annular packing 62 inside the secondary packing cylinder 58. The sleeve 64 is radially split to facilitate assembly. A radially split gland follower 66 abuts against the secondary annular packing 60 outside the secondary packing cylinder 58, and is attached to the secondary packing cylinder 58 by a flange 68 on the secondary packing cylinder 58 locating in a recess 70 in the radially split gland follower 66. It will be noted that the recess 70 is large enough to permit limited relative movement longitudinally between the radially split gland follower 66 and the packing cylinder 58. This limited relative movement allows the sleeve 64 to compress the secondary annular packing 62 and the radially split gland follower 66 to compress the secondary annular packing 60 before the wedge-shaped sleeve 8 is wedged between the packing rings 20 and 22, as will be described later. Means in the form of a captive key 72 releasably secures the radially split gland follower 66 in a stepped recess 74 in the clamping member 24. The captive key 72 is C-shaped and locates in slots 76 and 78 in the radially split gland follower 66. A recess 80 on the captive key 72 locates with compression springs 36 to secure the captive key 72 around the split gland follower 66.

The compression springs 34 and 36 are Belleville washers, disposed as pairs on the clamping bolts 26 and 28 respectively, with the concave sides of each pair facing one another. The nuts 30 and 32 are in pairs which the uppermost of each pair being a lock nut. Beneath the nuts 30 and 32 are washers 82 and 84 respectively. The compression springs 34 and 36 are spaced by washers 86 and 88 respectively from the clamping member 24.

The clamping bolts 26 and 28 extend slidably through bores 90 and 92 respectively in the clamping member 24. The bores 90 and 92 correspond with the clearance holes 44 and 46 respectively. The compression springs 34 and 36 are compressed between the clamping nuts 30, 32 and the clamping member 24. The cams 38 and 40 are each rotatably connected by pivots 94 and 96 respectively, on the sides of the clamping bolts 26 and 28 respectively, on the sides of the flanged portion 42, remote from the clamping member 24. The cams 38 and 40 have levers 98 and 100 respectively.

In operation the valve stem assembly is arranged as shown in FIGS. 1 to 3. For normal operating conditions the cams 38 and 40 are in the position shown in FIG. 3 and further compress the compression springs 34 and 36 beyond the compression imparted to them by the nuts 30 and 32 being suitably tightened on clamping bolts 26 and 28 respectively. Compressing the compression springs 34 and 36 by tightening nuts 30 and 32 first causes the sleeve 64 and split gland follower to compress the secondary annular packings 60 and 62 and partly drive the wedge-shaped sleeve between the packing rings 20 and 22. Continued tightening of the nuts 30 and 32 and movement of the cams 38 and 40 through 90° to the position shown in FIG. 3 drives the wedge between the packing rings 20 and 22. The packing rings 20 and 22 provide a primary packing which is the only packing which acts to seal the full pressure within the valve housing 1.

When it is required to actuate the valve stem 6 to open or close the valve the levers 98 and 100 are moved around pivots 94 and 96 to release the cams 38 and 40 and facilitate actuating the valve 6. This movement temporarily removes some of the compression applied to the packing rings 20 and 22, and any slight leakage that may occur passed the packing rings 20 and 22 is collected in the annulus around the four fluid ports 54 and does not leak passed the secondary annular packing rings 60 and 62. Any leakage which collects in the annulus around the four fluid ports 54 escapes into a leak-off collection port (not shown) where it can be directed to either a waste drain (not shown) or a collection vessel (not shown) as may be desired. In operation the contents of the leak-off collection vessel can be used as an indicator that more pressure should be applied to packing rings 20 and 22 by tightening nuts 30 and 32, on if leak-off continues at an unacceptable rate, that the packing rings 20 and 22 should be replaced.

Thus the use of the cams 38 and 40 to additionally compress the packing rings 20 and 22 allows these packing rings to be compressed to a degree which would prevent the valve stem 6 being actuated, but temporarily releasing the cams 38 and 40 relieves enough of the compression on the packing rings 20 and 22 for the valve stem 6 to be actuated.

In other embodiments of the present invention the wedge-shaped sleeve 8 may be connected directly to the split gland follower 66 with no secondary annular packing rings 60 and 62 being provided. These other embodiments may be used where a slight leakage to atmosphere whilst the valve stem 6 is being actuated is tolerable.

I claim:

1. A valve stem assembly, comprising a valve housing with a valve stem bore and a packing recess at the outer end of the valve stem bore, a valve stem extending through the valve stem bore and slidably located therein and through the packing recess, a wedge-shaped sleeve slidably located around the valve stem and dividing a portion of the packing recess into inner and outer annular spaces, the wedge-shaped sleeve having inclined inside and outside surfaces to taper inwardly in thickness towards the inner end of the packing recess, annular packings in the inner and outer annular spaces, a clamping member spaced from the valve housing and connected to the wedge-shaped sleeve for withdrawing the wedge-shaped sleeve from the packing recess, a plurality of threaded clamping bolts and nuts clamping the clamping member to the valve housing, compression springs on the clamping bolts urging the clamping member to push the wedge-shaped sleeve between the packings, thereby compressing the packings radially, and a plurality of cams each rotatably connected to one of the clamping bolts to be rotatably actuated to further compress the compression springs and apply an additional force urging the wedge-shaped sleeve between the packings.

2. A valve stem assembly according to claim 1, wherein a spacing cylinder having fluid ports therearound and flanged ends extending substantially across the packing recess and is in the packing recess and is integral with, and extends outwardly along the packing recess from, the wedge-shaped sleeve, a secondary packing cylinder divides an outer portion of the packing recess radially and is integral with, and extends along the packing recess from, the spacing cylinder, secondary annular pacing rings are on each side of the secondary packing cylinder, a sleeve slidably around the valve stem abuts against the secondary annular packing inside the secondary packing cylinder, a radially split gland follower abuts against the secondary annular packing outside the secondary packing cylinder and is attached to the secondary packing cylinder for limited relative movement therebetween longitudinally of the valve stem, and means releasably securing the radially split gland follower in a stepped recess in the clamping member.

3. A valve stem assembly according to claim 1, wherein the compression springs comprise Belleville washers, disposed as pairs on the clamping bolts, with the concave sides of each pair facing one another.

4. A valve stem assembly according to claim 3, wherein each clamping bolt extends slidably through corresponding bores in a flanged portion of the valve housing and the clamping member, the Belleville washers are compressed between the clamping nuts and the clamping member, and the cams are each rotatably connected to a portion of the clamping bolt on side of the flanged portion which is remote from the clamping member.

* * * * *